(12) United States Patent
Bradford

(10) Patent No.: US 6,518,897 B1
(45) Date of Patent: Feb. 11, 2003

(54) ANGLE QUANTIZATION USING LOG DIVISION

(75) Inventor: Shawn P. Bradford, Long Beach, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/944,254

(22) Filed: Aug. 29, 2001

(51) Int. Cl.[7] ................................................. H03M 1/48
(52) U.S. Cl. ........................ 341/111; 375/302; 375/298; 375/340
(58) Field of Search .................................. 341/111, 112, 341/116, 113, 115, 155, 156, 165; 375/340, 298, 302

(56) References Cited

U.S. PATENT DOCUMENTS

| | | | | |
|---|---|---|---|---|
| 4,523,221 A | * | 6/1985 | Chin et al. ..................... 358/21 |
| 4,747,067 A | * | 5/1988 | Jagodnik Jr. et al. ........ 364/715 |
| 5,265,128 A | * | 11/1993 | Widmer et al. ................ 375/58 |
| 5,440,267 A | * | 8/1995 | Tsuda et al. .................. 329/308 |
| 5,485,407 A | * | 1/1996 | Ishimoto ..................... 364/577 |
| 5,524,026 A | * | 6/1996 | Murata ........................ 375/329 |
| 5,786,781 A | * | 7/1998 | Tanguchi et al. ........... 341/111 |
| 5,832,041 A | * | 11/1998 | Hulyalkar ................... 375/340 |
| 5,953,311 A | * | 9/1999 | Davies et al. ................ 370/210 |

* cited by examiner

Primary Examiner—Brian Young
Assistant Examiner—John Nguyen
(74) Attorney, Agent, or Firm—Antonelli, Terry, Stout & Kraus, LLP

(57) ABSTRACT

A system to perform angle quantization includes a log ROM lookup table to provide a log of a real input (10) of a signal and a log of an imaginary input (20) of the signal. A subtractor (100) computes the difference between the log of the real input and the log of the imaginary input to provide a difference (102) equivalent to a division of the inputs, and a ROM lookup table (110) determines a phase from the difference.

2 Claims, 5 Drawing Sheets

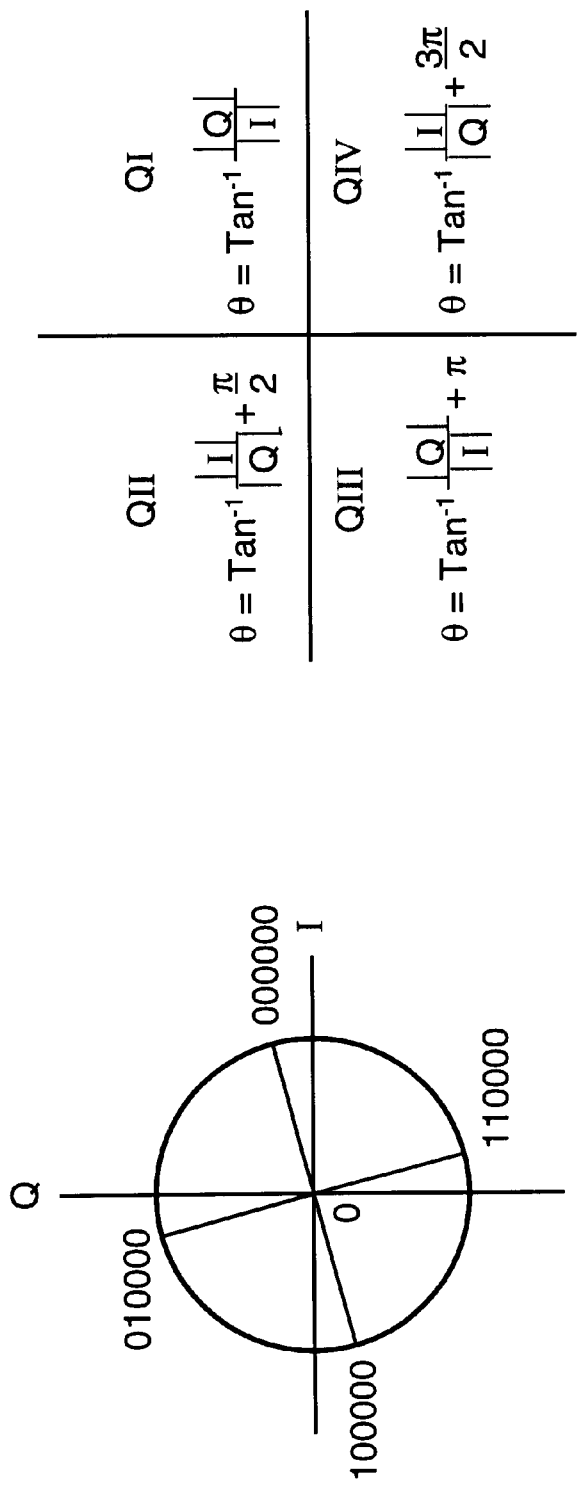
Figure 4
Figure 3
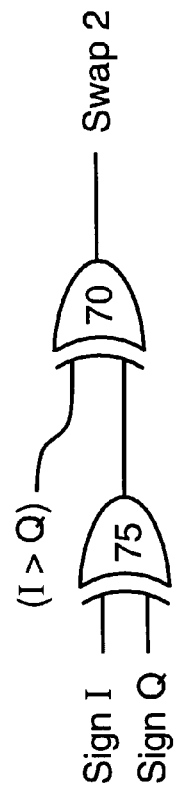
Figure 5

ANGLE QUANTIZATION USING LOG DIVISION

BACKGROUND OF THE INVENTION

The present invention relates generally to a signal demodulator, and more particularly, the present invention relates to a system to perform angle quantization using log division.

Angle Quantization (AQ) is a function that is widely used on many communication hardware demodulators. A basic summary of the field is that plain radio waves of a particular frequency, called carrier waves, are manipulated to carry useful information, such as sound, digital data, or pictures. To do so, a transmitter changes the carrier waves in some way that corresponds to the information, and a receiver has to detect the changes to recover the information. Changing the carrier to put information into the signal is called modulation. Getting the information out at the receiver is called detection or demodulation.

One modulation technique is to transmit the information in the phase of a signal. This is called phase shift keying. Here, an angle quantizer is utilized to examine an incoming signal and determine the phase of that signal. Once the phase has been determined, the desired information can be retrieved or calculated.

Prior art systems utilized electronic circuits to analyze the inputs of a signal to determine its phase. The circuit shown in FIG. 1 is an example of such a circuit. The inputs to the circuits are considered and labeled as I and Q, which represent coordinates in a Cartesian Coordinate System. The input I represents the real component of a signal and the input Q represents the imaginary component of a signal. Once the coordinates are plotted, a line can be drawn to the origin permitting a measurement of the angle between the line and the axis. This angle is considered the phase of the signal and the plotting of the I and Q inputs is called phase mapping. Thus, the output of the entire circuit is the phase of a signal.

Conventional signal demodulators performing angle quantization utilize a ROM lookup table to perform the step of an I/Q division and the arc tangent phase mapping. Because the I/Q division was being performed within the ROM, the sizes of the ROMs become necessarily enormous. The ROM sizes could be measured by $2^{(2X-4)}$, where X is the number of phase mapping. It is therefore desirable to reduce the amount of hardware that is required to perform angle quantization as the bit widths increase.

SUMMARY OF THE INVENTION

According to a preferred embodiment of the invention, a system to perform angle quantization comprises: a log ROM lookup table to provide a log of a real input of a signal and a log of an imaginary input of the signal, a subtractor to subtract the log of the real input from the log of the imaginary input to provide a division, and a ROM lookup table to calculate a phase of the division.

BRIEF DESCRIPTION OF THE DRAWINGS

The following description of preferred embodiments refers to the accompanied drawings, in which:

FIG. 3 illustrates four different phases having the same X−2 least significant bits.

FIG. 4 illustrates the phase equations for each of the four quadrants.

FIG. 5 is a schematic diagram of the logic devices used to determine whether a second swapping of the rails is required.

DETAILED DESCRIPTION OF THE PREFERRED EMBODIMENTS

Figure 2:
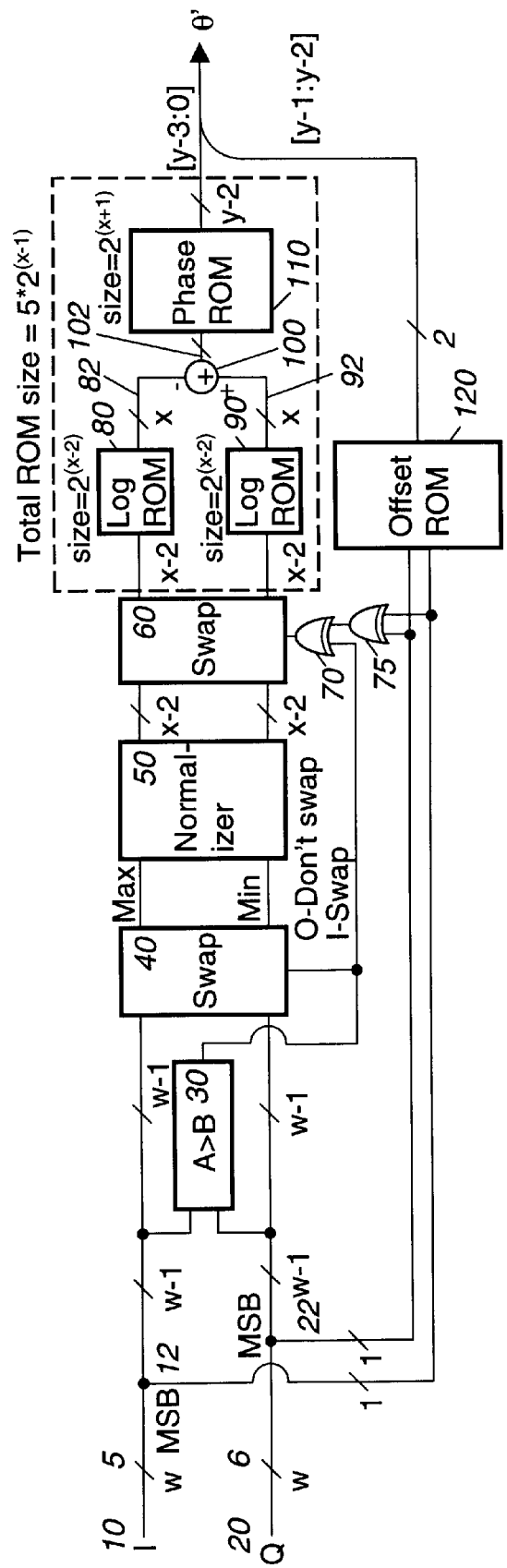
FIG. 2 is an overview of an exemplary angle quantizer constructed in accordance with the teachings of the present invention.

As shown in FIG. 2, the disclosed embodiment of an angle quantizer comprises a first input I 10 which represents the real component of a signal, and a second input Q 20 representing the imaginary component of the signal. The bit width of the signal being analyzed is represented as W in the figure. The bit width is the same for both I 10 and Q 20. In other words, if the bit width of the signal is being measured to eleven bits of accuracy, then W would equal eleven for both the real and imaginary components, 10 and 20 respectively.

As the signal enters the circuit in FIG. 2, a quadrant locator examines the Most Significant Bit (MSB) 12 of the real input 10 and the MSB 22 of the imaginary input 20 of the signal to determine what quadrant of the coordinate system it is located in. In other words, the MSB of the signal determines the appropriate sign, and if the MSB is a one, it'a negative number. If the MSB is a zero, it is a positive number. The MSB is then removed. This is because the absolute value of the signal is taken before it enters the comparator, reducing the bit width to W−1.

After the MSBs are examined, the signal enters a first comparator 30 to determine whether the real input 10 or the imaginary input 20 is greater. This is a hardware technique to ensure that the larger input is always on the top rail 5. As seen from FIG. 2, the real input 10 enters the comparator 30 at A, and the imaginary input 20 enters the comparator 30 at B. If the real input 10 is greater than the imaginary input 20, then the comparator 30 outputs a 0. If however, the real input 10 is smaller than the imaginary input 20, then the comparator 30 outputs a 1. The output of the comparator is connected to and controls the operation of a first swapping device 40. Thus, when the comparator 30 outputs a 1, the swapping device 40 swaps the real input 10 and the imaginary input 20. This ensures that the larger input is always on the top rail 5. This is important because the input bit width is normalized to a much smaller input. For example, a signal having 24 bits is normalized to nine bits in an eleven bit angle quantizer. As a result of this normalization, the greater of the two inputs controls the normalization process. This enables the maintenance of as much precision as possible without wrapping values.

After passing through the swapping device 40, the inputs are sent to a normalizer 50. At this point, the larger input, either real 10 or imaginary 20, is always on the top rail 5, and the smaller one is on the bottom rail 6. The reason the larger input is on the top rail 5 is because the normalizer 50 normalizes to two less than the number of bits that it is desired to angle quantize. Thus, the output of the normalizer 50 is X−2. The reason it is two bits less than the original X is because those two bits represent the quadrant location. In other words, the X bit output is comprised of a two bit quadrant and an X−2 bit phase, where the phase of interest is contained in the X−2 bits. The normalizer 50 also functions as a master/slave to drive the desired bits of interest, or those bits that are toggling. For example, if the input bit width entering the normalizer 50 is eight bits, then its output would be six bits. Likewise, the normalizer would select the most significant six bits that are toggling, because these bits are where the relevant information is contained, providing enhanced precision. The six bits that are toggling do not include the MSB that was earlier stripped off. The toggling bits would not necessarily be the first six bits, the middle six bits, or the last six bits, but whatever the existing maximum. This allows the circuit to achieve a higher dynamic range, because the normalizer 50 is picking the bits that are actually toggling, as opposed to just picking a static group.

Table 1 shows three examples of how toggling bits are selected. In these examples, the master numbers represent the numbers having the greater values, and the slave numbers represent the numbers having the lesser values. Also, these values shown are illustrative of an eleven bit AQ where the output is nine bits.

TABLE 1

|  | Input | Output |
|---|---|---|
| Master 1 | 00\|101101000\|10 | 101101001 |
| Slave 1 | 00\|000100011\|00 | 000100011 |
| Master 2 | 0000\|101101011\| | 101101011 |
| Slave 2 | 0000\|000010100\| | 000010100 |
| Master 3 | \|101100110\|0101 | 101100110 |
| Slave 3 | \|000000000\|0101 | 000000000 |

The signal inputs 10 and 20 are then sent to a second swapping device 60 that takes into account the first swapping device 40 and models the division illustrated in FIG. 4. Exclusive OR logic devices 70 and 75 control the swapping device 60. Inputs to the logic devices 70 and 75 are MSB 12, MSB 22, and the output of the comparator 30. The second swapping device 60 also takes into account the quadrant of the incoming signal.

The second swapping device 60 takes into account the first swapping that is needed for the master/slave normalizer, and the quadrant mapping to determine the correct phase of the signal. The rails are swapped in order to determine the correct phase without having knowledge of the quadrant. FIG. 3 illustrates a specific example of four different phases that exist, where all have the same X−2 least significant bits (LSBs). Knowledge that this principle holds true for all possible inputs, permits a reduction in the sizes of the ROM by a factor of four. To determine the correct X−2 LSB, it is necessary to perform the division correctly depending on the quadrant.

FIG. 4 illustrates the phase equations for each of the four quadrants. As seen in FIG. 4, the division (IQI/III) is the same in both quadrant I (QI) and quadrant III (QIII). Also, the division (III/QI) is the same in quadrant II (QII) and quadrant IV (QIV). Because the division circuit is designed for QI and QIII, an additional swap is necessary for phases in QII and QIV.

Table 2 illustrates how it is determined whether or not to swap the inputs 10 and 20 on the rails 5 and 6. Table 2 Includes all possible combinations of inputs 10 and 20. The sign I column represents the real input 10 and the sign Q column represents the imaginary input 20. In these columns, a 0 represents a positive input and a 1 represents a negative input. The I>Q column represents the output or result from the comparator 30. In this column, a 0 represents a true result, and a 1 represents a false result. The Swap 1 column illustrates when the first swapping device 40 swaps the inputs. Thus, Swap 1 controls the master/slave position. This swapping device 40 is controlled by the output of the comparator 30 (I>Q), where a 1=swap and a 0=do not swap. The Swap 2 column illustrates when the second swapping device 60 swaps the inputs Implementing the Swap 2 determination in hardware is more involved, but is easily accomplished using Kamough mapping. Kamough mapping produces the resulting circuit as shown in FIG. 5. The exclusive OR gates 70 and 75 from FIG. 5 are also illustrated in FIG. 2. For the portion of the circuit shown in FIG. 5, an output of a 0=do not and an output of a 1=swap.

TABLE 2

| Sign I | Sign Q | I > Q | Swap 1 | Swap 2 |
|---|---|---|---|---|
| 0 | 0 | 0 | No | No |
| 0 | 0 | 1 | YES | Yes |
| 0 | 1 | 0 | No | Yes |
| 0 | 1 | 1 | Yes | No |
| 1 | 0 | 0 | No | Yes |
| 1 | 0 | 1 | Yes | No |
| 1 | 1 | 0 | No | No |
| 1 | 1 | 1 | Yes | Yes |

After exiting the swapping device 60, the real component 10 of the signal then enters a log ROM lookup table 80. The imaginary component 20 also exits the swapping device 60 and enters a log ROM lookup table 90. The log ROM lookup tables 80 and 90 function by storing the previously calculated or precomputed logarithmic results for any input into separate addresses. When called upon, the log ROM lookup tables 80 and 90 provide the correct log value according to the address requested. This provides for the log mapping of the inputs. While FIG. 2 shows an embodiment with two identical log ROM lookup tables 80 and 90 to perform this function, the same result could be achieved by use of only one log ROM lookup table that would operate using a time-sharing algorithm. This would be a simple modification as the data stored in the log ROM lookup tables 80 and 90 are identical. There may however, be a trade-off in speed when utilizing only one log ROM lookup table.

Time-sharing of a single ROM lookup table is extremely hardware dependent. It is based solely on the system clock and the speed at which the data is entering the system. For example, because it takes one clock cycle to perform the ROM lookup, when the data changes at the rate of every clock cycle, it is impossible to use the same ROM lookup table for both the I rail 10 and the Q rail 20. However, when the data changes at the rate of every other clock cycle, the data remains constant for two consecutive clock cycles. Therefore, the hardware can be designed to include a single ROM lookup table wherein one clock cycle is used for the I rail 10 and another clock cycle is used for the Q rail 20. While some additional control is necessary, it is smaller than an additional ROM.

The size of the log ROM lookup tables 80 and 90 is quite substantial. Each ROM is $2^{(X-2)}$. This is because a precomputed value is stored for all possible inputs that are phase mapped. Therefore, as the bit width increases, the size of the ROM lookup table increases exponentially. For example, for a bit width of 11, the ROM lookup table stores $2^{(11-2)}$ values or 512 addresses. If two ROM lookup tables are used as in FIG. 2, the size would be twice as big.

Trough simulation, it was determined that the bit widths coming out of the log lookup tables 80 and 90 should each increase by two. This could be increased further to gain additional accuracy, or it could increase by less and trade precision for memory size. This is one of the great advantages of this design, in that it allows a great deal of flexibility to trade phase precision with hardware size.

Table 3 illustrates the relationship between the bit width and the precision of the output. The address input into the ROM represents the value that the log is taken of. The number 21 is the exemplary address used in Table 3. The equation is thus y=log(address) or y=log(21)=1.322219295. This result is represented in binary as 010101001010 Table 3 thus clearly shows an increase in precision of the output as the bit width increase.

TABLE 3

| Bit Width | Value of y (dec) | Binary |
|---|---|---|
| 2 | 1 | 01 |
| 3 | 1.5 | 011 |
| 4 | 1.25 | 0101 |
| 5 | 1.375 | 01011 |
| 6 | 1.3125 | 010101 |

The outputs 82 and 92 of the log ROM lookup tables 80 and 90 enter a subtractor 100 to subtract the log of the real input 10 and the log of the imaginary input 20 to provide a division of the inputs. The subtractor 100 could be a simple summing device that adds the negative of output 82 to output 92. It should also be noted that the subtractor 100 may be viewed as a comparator. In order to assure precision, the output 102 of the subtractor should increase by one because there is often a bit growth of one when adding or subtracting two numbers. For example, the sum of seven plus seven is 14. The binary representation of this summation using four bits is: 0111 (7)+0111 (7)=01110 (14) where the result of fourteen is represented with five bits. Also as a note, subtraction is simply a special case of addition. In both addition and subtraction, the growth bit is always the MSB or sign bit. The bit size increases by one bit because the decimal number fourteen cannot be represented in binary using only four bits, unless the result is rounded and truncated. In these last two steps, the circuit has subtracted the log of the imaginary input from the log of the real input. These steps perform the equivalent of a log division by taking advantage of the mathematical principle that the log of X/Y is equivalent to the log of X minus the log of Y. This concept is therefore providing an external hardware division that greatly reduces the size of the ROM lookup A perceived drawback to calculating the log division in hardware is that there exists a finite precision resulting from the division, which results in some degradation in accuracy. However, by plotting out the simulation performance, it was discovered that the degradation was minimal. In other words, the bit error rates utilizing the circuit shown in FIG. 2 were nearly identical to the bit error rates using the prior art, such as that shown in FIG. 1. Thus, similar precision is achieved while utilizing significantly less hardware. If the desired application can permit more degradation, the initial bit width can be reduced, resulting in a substantial reduction in the necessary size of the log ROM lookup table(s).

The output 102 of the subtractor 100 is provided to a ROM lookup table 110. The ROM lookup table 110 then provides the values for the anti log and arc tangent of 102, thus determining the phase angle of the signal. Because the anti log and arc tangent are both mathematical functions, it is easy to map those in the same ROM 110. A simple and still equivalent alternative would be to utilize separate ROMs, one for the anti log and one for the arc tangent.

The resulting number of addresses stored by the phase ROM 110 is $2^{(X+1)}$. Thus, the total number of addresses stored by log ROM 80, log ROM 90, and phase ROM 110 is $2^{(X-2)}+2^{(X-2)}+2^{(X+1)}$. This equation can be reduced to $5*2^{(X-1)}$. This design as shown in FIG. 2 requires, for example, if X=11 bits, 51.2 times less hardware than previous designs.

As mentioned above, the output of the phase ROM 110 determines the angle within an appropriate quadrant. That quadrant is determined by the output of the offset ROM 120, which has as its inputs the MSBs of the real input 10 and the imaginary input 20. The combination of the output from offset ROM 120 and phase ROM 110 provides the phase of the incoming signal being detected.

Figure 1:
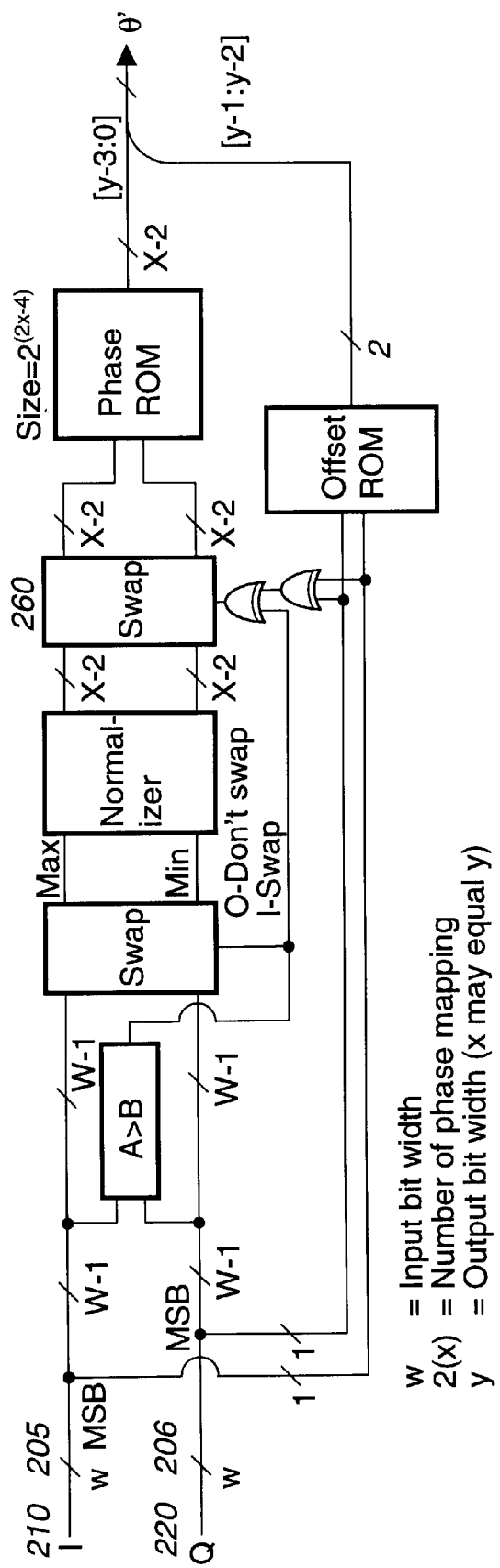
FIG. 1 is an overview of an angle quantizer utilizing teachings of the prior art.

The prior art calculated the phase angle by utilizing the circuit shown in FIG. 1. The difference here is that a single ROM lookup table was used to take the real component 210 and the imaginary component 220 to perform the I/Q division and also the arc tangent phase mapping. This brute force method required an enormously large ROM lookup table because as the number of bits that were being phase mapped increased, the size of the ROM doubled. Its size is measured by $2^{(2X-4)}$.

Figure 6:
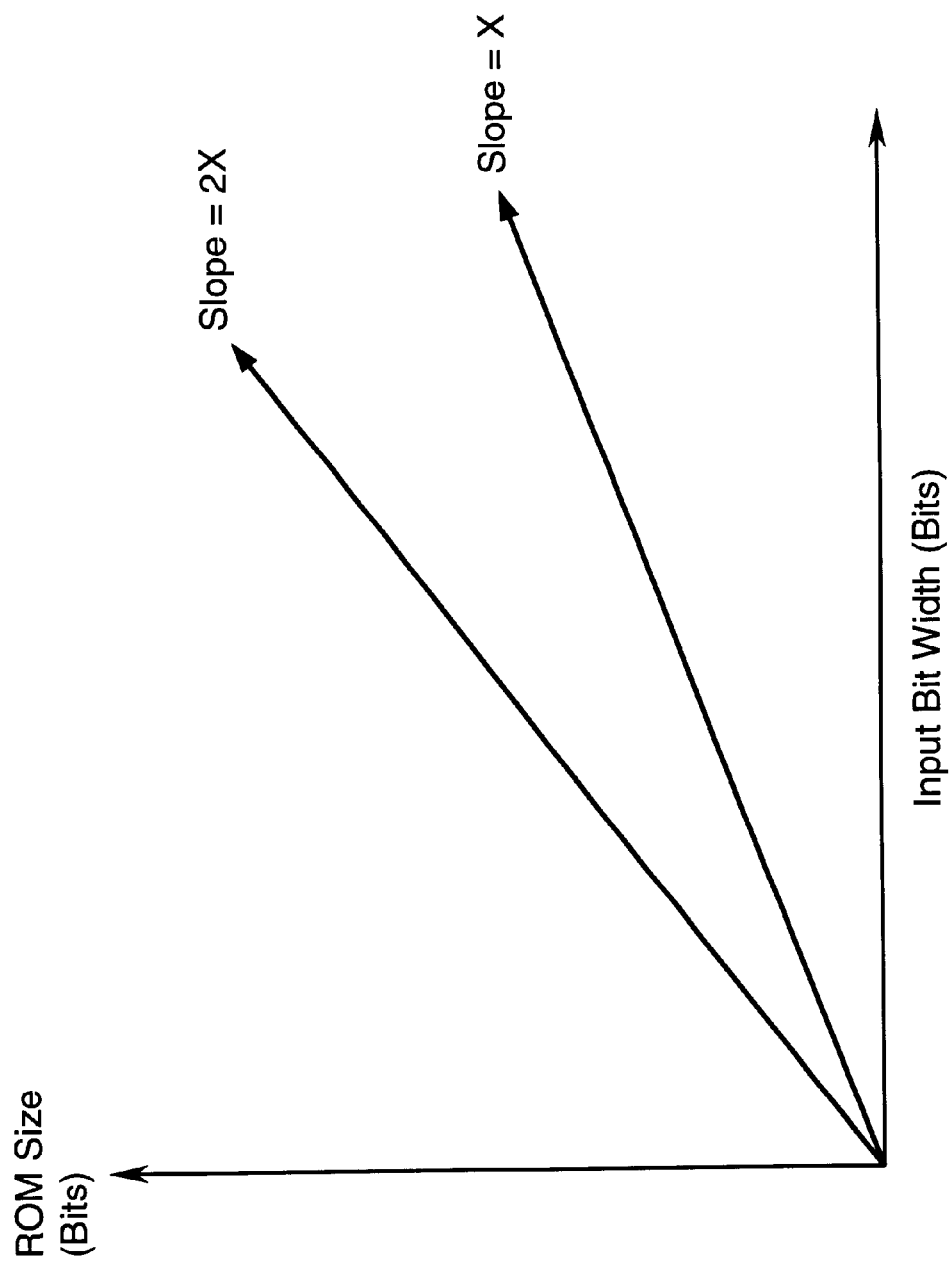
FIG. 6 is a graph comparing the increase in size of the log ROMs relative to the input bit width.

So, while the size of the ROM in FIG. 1 also increases exponentially, its slope is much greater than in the present design. That is, the ROM used in the prior art circuit shown in FIG. 1 grows twice as fast exponentially as the ROM used in the circuit shown in FIG. 2. One factor that leads to its enormous size is that the ROM in FIG. 1 is actually doing the division inside the ROM table, as opposed to doing the division in hardware through the technique shown in FIG. 2. Thus, the ROM size is based upon the size of the real input 210 and the imaginary input 220. As the bit width W of the inputs 210 and 220 increase, the bit width on each rail 205 and 206 also increases by one. That is, both the real input 210 and the imaginary input 220 increases by one bit. Therefore, a graph of this increase has a slope of 2X. A graphical illustration of this is shown in FIG. 6, In comparison, a graph of the increase of the log ROMs 80 and 90 in FIG. 2 has a slope of only X. This too is illustrated in FIG. 6. Thus, FIG. 6 shows a comparison of how the sizes of the ROMs increase with an increase in the initial bit width for circuits of the prior art as well as circuits implemented in accordance with the embodiment shown in FIG. 2.

A decrease in the total ROM size required by the design shown in FIG. 2 over the prior art design shown in FIG. 1 can be calculated by the following equation: $2^{(2X-4)}/(5*2^{(X-1)})$. Thus, the design shown in FIG. 2 is $2^{(X-3)}/5$ times smaller than the design shown in FIG. 1. Taking for example and 11 bit AQ, the savings in size would be $2^{(2*11-4)}/(5*2^{(10)})$ or 51.2. Thus, it is readily apparent that the embodiment shown in FIG. 2 utilizes much less hardware than that required by previous designs.

In order to optimize the functionality of the circuit shown in FIG. 2, it is best to design the circuit in conjunction with a software routine that allows many input addresses to map to the same output address. The software routine is needed only in the design phase of the circuit to calculate the ROM contents. Because the embodiment shown in FIG. 2 loses some precision in computing the log division (hardware components 80, 90, and 110), there are several addresses that map to the same output address. There may be many addresses that map the same address into the phase ROM, but each one of those angles may not be the same. The software takes an average and determines the phase that gives the least error for all inputs. Thus, the software would determine the log ROMs and the phase ROMs for these inputs. In other words, it is performing a precalculation and providing the best phase for a particular input address.

Figure 7:
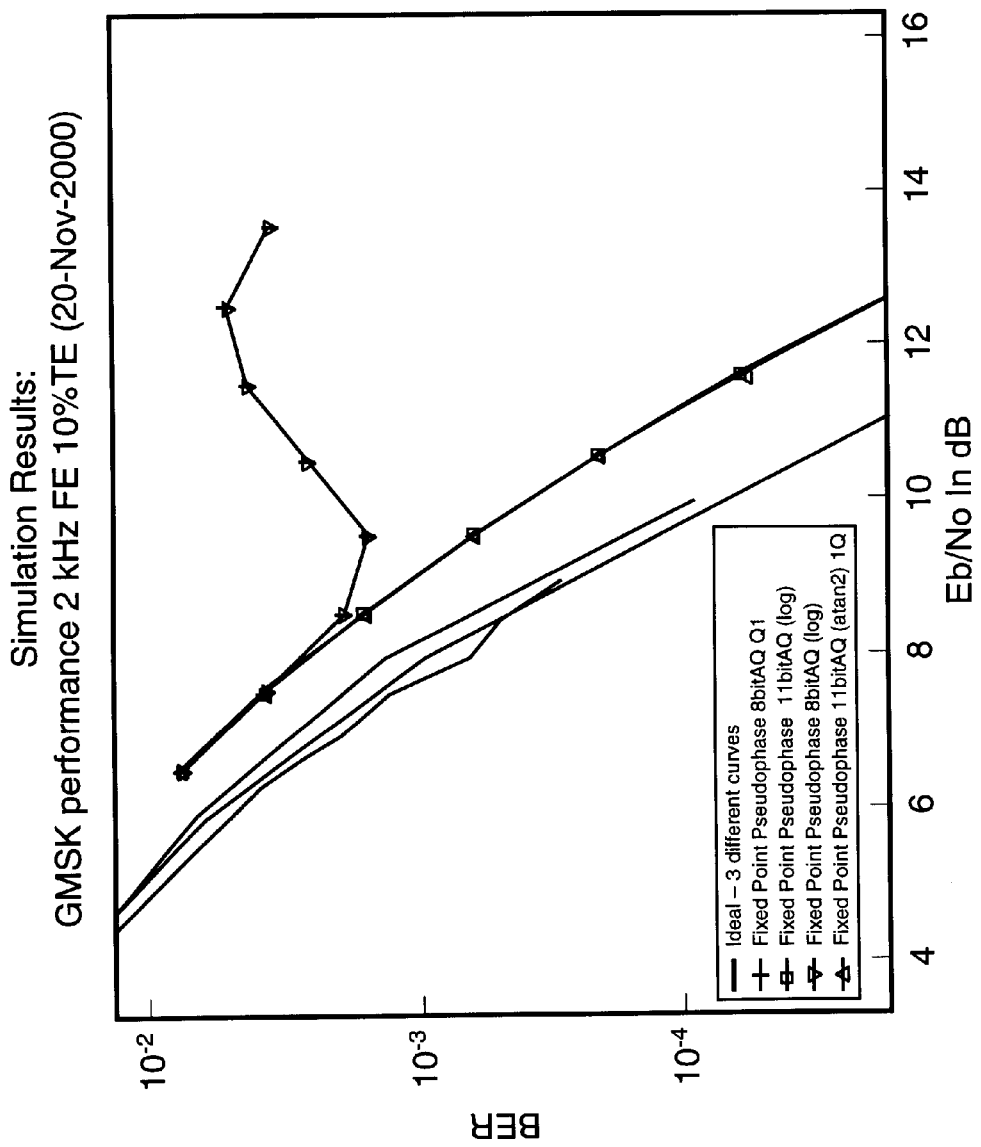
FIG. 7 is a graph of simulation results from an exemplary angle quantizer.

FIG. 7 offers a graph of simulation results of angle quantization using the log division technique shown in FIG. 2. The X axis of the graph represents the Eb/No in dB, or the signal-to-noise ratio. This is the measure of the signal power over the noise level, or a measure of how much more power is present than the overall noise in the environment. It is also what determines the performance of a particular demodulator. The Y axis of the graph represents the Bit Error Rate (BER).

The BER curves depicted on the graph are considered terminal because they represent a link only from a terminal to a satellite, not a round trip path that would include a link from the satellite back down to a terminal. In other words, the curves represent the angle quantization performance on only one of the paths. The three curves on the left of the graph represent the theoretical curves or ideal curves. As expected, through simulation, the real time curves were a little bit to the right of the ideal curves. Ideally, the real time curves should look exactly like the ideal curves, except shifted to the right as a result of degradation due to the hardware and due to some errors on the signal. These errors may be frequency and timing errors, both of which cause degradation in performance.

The BER curves graphically illustrate the principle that as the signal strength increases, so does the performance, which causes the BER to decrease. That is why the curves go down as the power increases. The lowest BER that could possibly be achieved is 50%, because at that point, you are essentially tossing a coin and guessing that the data is a 0 or a 1. Zooming out on this graph would show that for very low power levels, the BER would level off at 0.5.

As seen in FIG. 7, the performance of both the 8 bit AQ and the 11 bit AQ were nearly identical for the circuit shown in FIG. 2 and the prior art circuit shown in FIG. 1. For the 8 bit AQ, it can be seen that there was a performance floor that was hit. Neither the circuit shown in FIG. 1 nor FIG. 2 would perform better than $10^{31}$. It was therefore determined that the number of bits being angle quantized needed to be increased. It is apparent by looking at the simulation curves representing 11 bit angle quantization, that these curves do not hit a performance floor. That is, the BER for 11 bit angle quantization continues to decrease as the signal-to-noise ratio is increased.

The invention has been described in terms of several preferred embodiments. It will be appreciated that the invention may otherwise be embodied without departing from the fair scope of the invention defined by the following claims.

I claim:

1. A method of performing angle quantization, the method comprising the steps of:

locating a most significant bit of a real input and an imaginary input of a signal to determine a quadrant location of the signal, comparing the inputs of the signal, swapping the inputs if the imaginary input is greater than the real input, normalizing the inputs, swapping the inputs if quadrant mapping indicates the phase of the signal requires swapping, performing the log mapping of the real input and the imaginary input of the signal by use of a log ROM lookup table to provide a log of the real input and a log of the imaginary input, calculating a difference between the log of the real input and the log of the imaginary input, and calculating an antilog and an arctangent from the resulting difference by use of a ROM lookup table.

2. A system to perform angle quantization, the system comprising:

a quadrant locator to determine a most significant bit of a real input and an imaginary input of a signal, a first comparator to compare the inputs of the signal, a first swapping device to swap the inputs if the imaginary input is greater than the real input, a normalizer to normalize the inputs, a second swapping device to swap the inputs if quadrant mapping indicates the phase of the signal requires swapping, a log ROM lookup table to provide a log of the real input of the signal and the log of the imaginary input of the signal, a second comparator to calculate a difference between the log of the real input and the log of the imaginary input, and a ROM lookup table to calculate an antilog and an arc tangent from the comparison.

* * * * *